March 3, 1959    T. H. HINCHCLIFFE    2,875,887
CONVEYOR BELT CLEATS
Filed Dec. 21, 1953      3 Sheets-Sheet 3
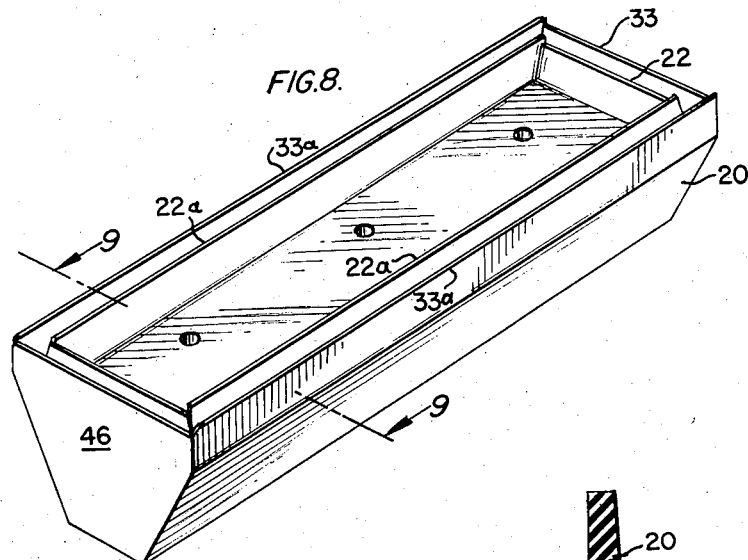
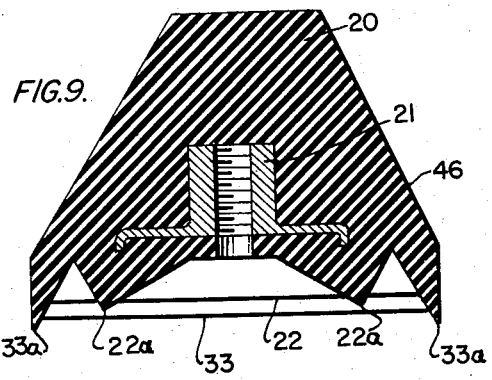
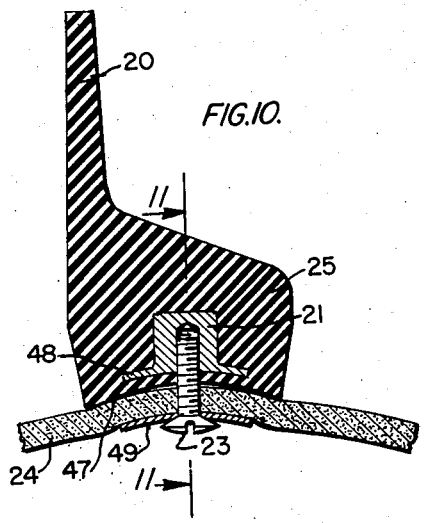
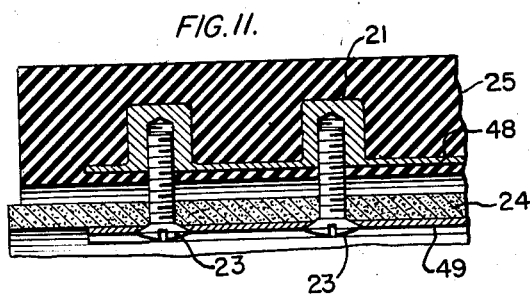
THEODORE H. HINCHCLIFFE,
INVENTOR.
BY *W. Glenn Jones*
ATTORNEY.

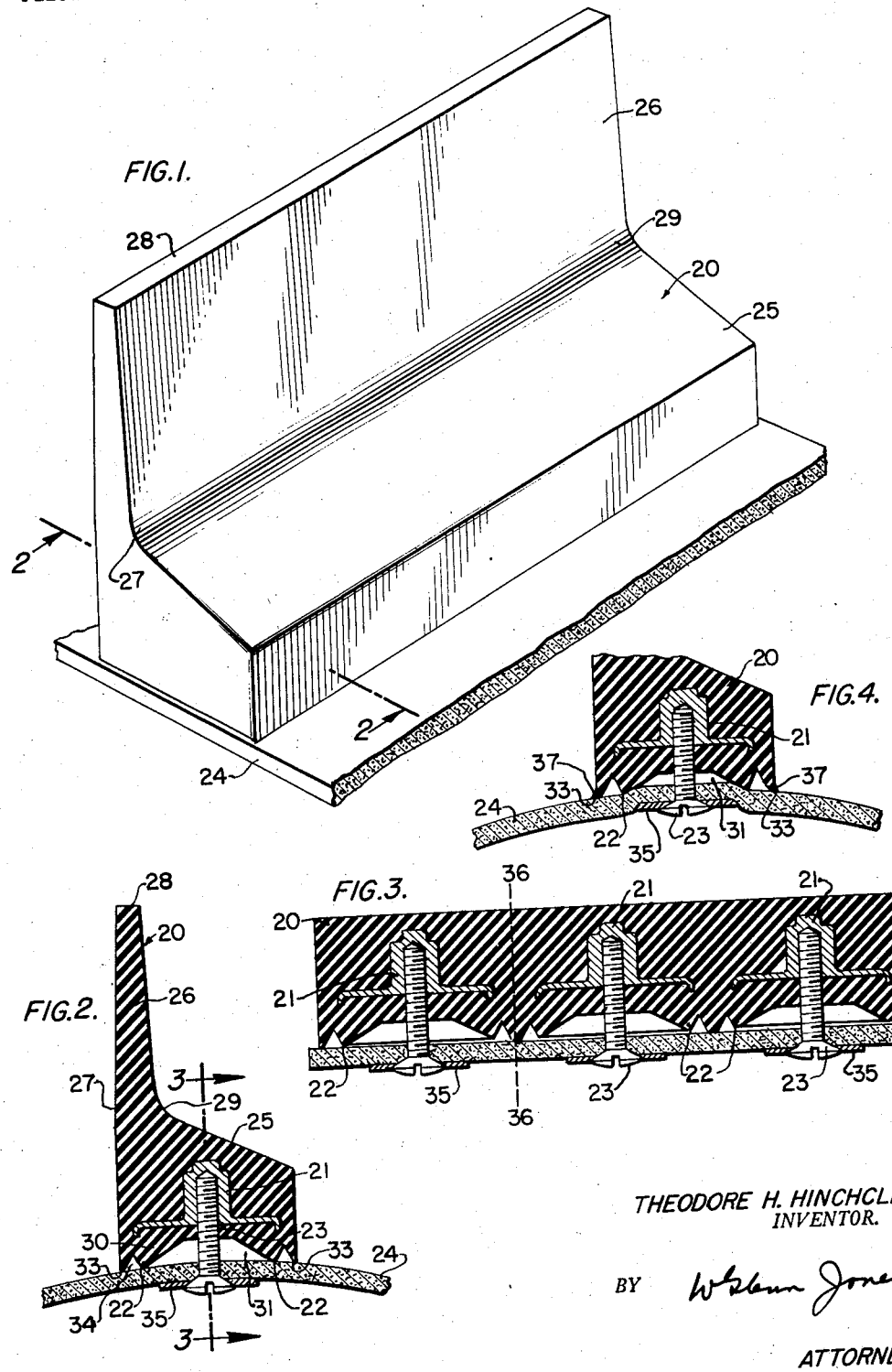

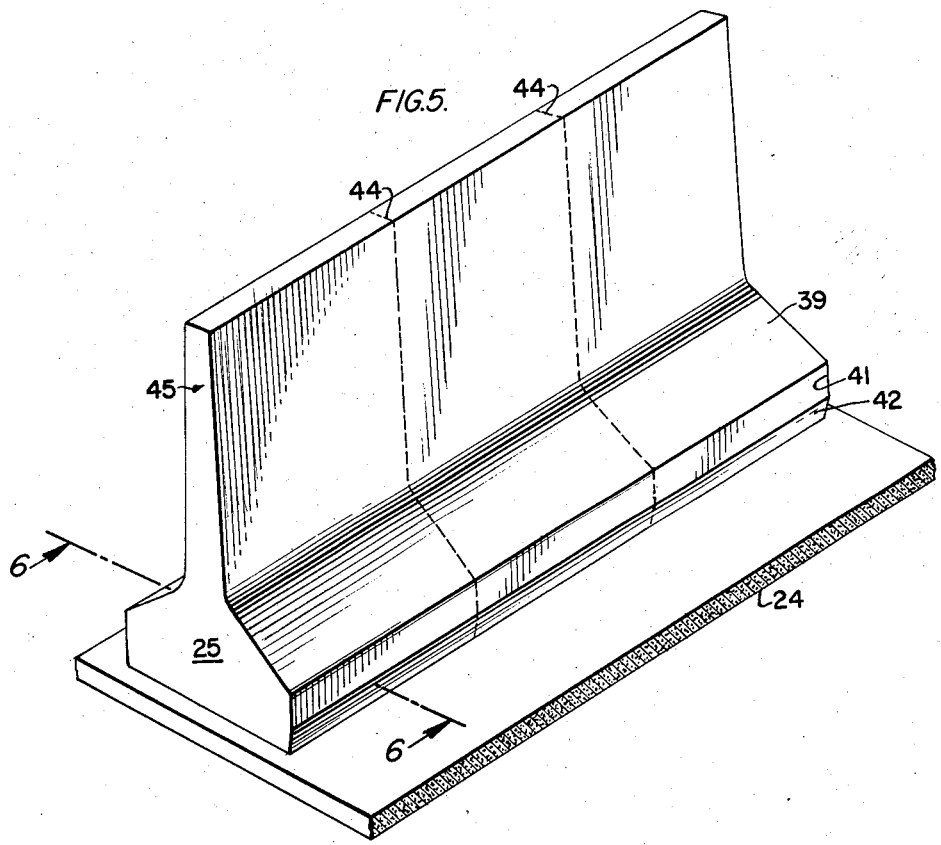
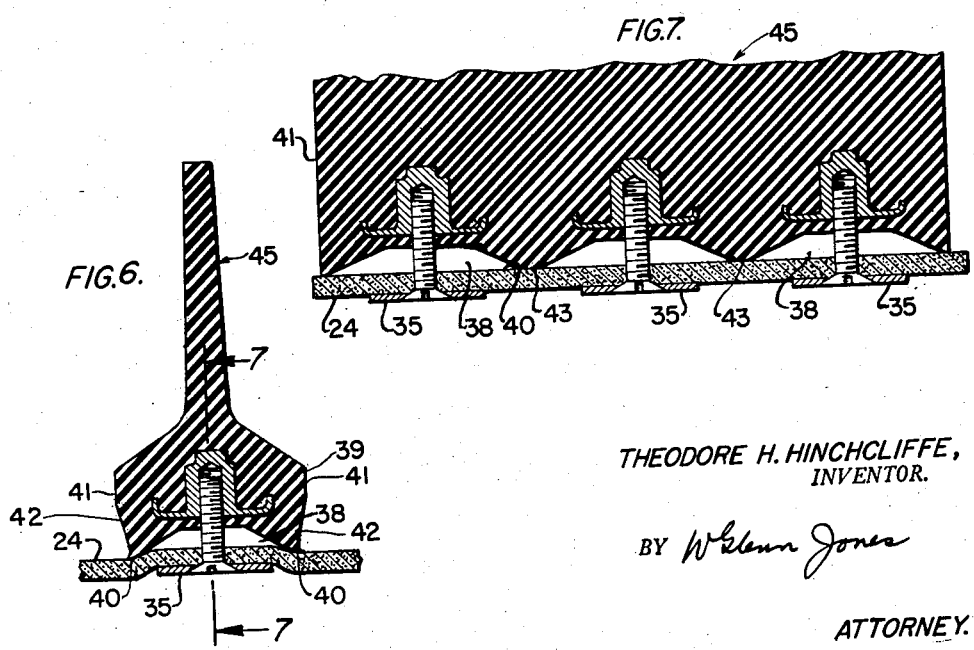

United States Patent Office 2,875,887
Patented Mar. 3, 1959

2,875,887
CONVEYOR BELT CLEATS

Theodore H. Hinchcliffe, Pasadena, Calif.

Application December 21, 1953, Serial No. 399,437

3 Claims. (Cl. 198—199)

This invention relates to improvements in belt conveyors and particularly to improvements in the transversely disposed cleats usually carried by such conveyor belts and is a continuation-in-part of my application Serial No. 367,476, for Belt Cleat Supports, filed July 13, 1953, now Patent No. 2,809,743.

In the common practice of assembling conveyor belts as used in agricultural, milling, and various manufacturing processes, it is customary to provide variously shaped cleats fastened directly to the belt by means of bolts or other similar fastenings. These cleats are generally made of metal or wood or such other inflexible material and therefore cannot bend or yield when passing around or over the rollers or pulleys on which the belt is suspended. This inflexibility results in a wearing and enlargement of the bolt holes which not only results in a progressive weakening of the belt, but allows the cleat to tilt away from the belt surface. This tilting soon results in an ever enlarging crack between the base of the cleat and the belt surface so that portions of the material being conveyed may lodge therein. It is obvious that in food handling apparatus, such collection of material under the cleat would be highly undesirable and unsanitary.

The primary object of my invention, therefore, is to supply a belt cleat which will obviate the above mentioned disadvantages.

Another object of my invention is to furnish a device which may be used with facility in the field and enable the individual user of conveying machinery to form his own cleats of a length designed to fit his own particular needs.

A further object of my invention is to provide means whereby the cleats of a conveyor belt may be secured thereto with the maximum protection against undue wear and tear of said belt.

Still further objects of my invention are to provide means whereby transverse cleats may be secured to conveyor belts in such a manner as to furnish maximum sanitation in food handling machinery and which cleats are not subject to deleterious results from sudden shocks or considerable overloading.

Further objects and advantages of my invention will be seen in the following description and drawings in which:

Figure 1 is a perspective view showing one form of my improved cleat.

Figure 2 is an elevation in cross section taken on the line 2—2 of Figure 1.

Figure 3 is an elevation in cross section of the cleat shown in Figure 1 taken on the line 3—3 of Figure 2.

Figure 4 is a partial elevation in cross section similar to that shown in Figure 2 but showing the parts in operative conjunction.

Figure 5 is a perspective view of another embodiment of my invention.

Figure 6 is an elevation in cross section on the line 6—6 of Figure 5.

Figure 7 is an elevation in cross section taken on the line 7—7 of Figure 6.

Figure 8 is a perspective view of another embodiment of my invention.

Figure 9 is an elevation in cross section, reversed, taken on the line 9—9 of Figure 8.

Figure 10 is an elevation in cross section of still another embodiment of my invention, and Figure 11 is an elevation in cross section taken on the line 11—11 of Figure 10.

With reference to the drawings, particularly to Figures 1 to 4, inclusive, the main body of my improved cleat is indicated by numeral 20. This body may be formed of rubber, leather, hard pressed felt, certain plastics or other similar resilient materials. In the embodiment shown, this body may be formed of rubber or rubber substitute. Threaded inserts 21 are molded therein. These inserts may be of metal or plastic, are square or rectangular in shape, and may be dished as shown to reinforce the belt gripping projections 22. Elevator bolts 23 are passed through punched or drilled holes in belt 24 and engage threaded inserts 21 to secure the main body 20 of my improved cleat to the belt. This conveyor belt may be made of any of the usual materials used for such belts as canvas, leather, rubber, textiles or various combinations thereof.

In the embodiment of my improved cleat shown in Figure 1, main body 20 comprises a main base portion 25 and an extended offset rib 26. In order to furnish maximum strength and resistance to unusual shocks, rib 26 is tapered from its juncture 27 with the base portion 25 to its extremity 28. Also for strength, a radius of juncture 29 is provided between the rib 26 and the main base portion 25.

As shown in Figures 2 and 3, the belt engaging part 30 of the main base portion 25 is of a particular structure. The inner concave hollow 31 is generally in the form of a truncated pyramid. The base of this concavity is formed by the belt gripping projections 22. An additional group of lips 33 is provided, formed outwardly of projections 22, conforming in general configuration therewith and spaced therefrom by angular grooves 34. A plate 35 is provided to engage the heads of the elevator bolts 23.

It should be noted particularly that the plane of the belt gripping projections 22 of main base portion 25 is slightly removed from the face of the belt 24, whereas the plane of the lips 33, as shown in Figure 2, is contiguous with the face of the belt.

It should also be further noted that the longitudinal belt engaging surface of my cleat is formed in squares or rectangles so that the cleat may be shortened by one or more units by cutting the cleat, say at the dotted line 36—36, thus facilitating the use of my improved cleat to suit the plans and designs of the user.

A further significant feature of my invention is that the projections 22 and the lips 33 are formed of different angular configurations, lips 33 being formed with an acute angle whereas projections 22 are formed with an obtuse angle.

In operation, as shown in Figure 4, when elevator bolt 23 is screwed up tightly into the threaded insert 21, the belt 24 is drawn up into the concavity 31 by the plate 35. By forming projections 22 with an obtuse angle, the base portion is sufficiently strengthened so that belt 24 may be drawn up to effect a tight seal without distortion. Lips 33 are compressed and flattened outwardly as shown at 37, thus reinforcing the seal. Then, as the belt curves over its supporting pulley or roller, lips 33 will follow the curvature thereof and thus maintain the seal between the base portion and the curved belt. Being inherently stronger, the projections 22 not only establish a secondary seal between the cleat and the belt but also prevent the weaker lips 33 from being compressed too much and perhaps distorted beyond the elastic limit of the material used.

Figures 5, 6 and 7 portray a similar separable cleat. The difference lies in the configuration of the belt engaging surface 38. The inner concave portion is in the form of a truncated pyramid wherein the dimensions of the base thereof are less than the corresponding dimensions of the main base portion 39. Thus, as shown in Figure 6, the distance between the points or lines 40 is less than the distance between the two sides 41. The sides 41 terminate short of the base and are then angled slightly inward to meet the lines 40, as shown at 42, except on the ends of the cleat which may be left straight up and down. The purpose of the undercut on the leading and trailing edges is to accentuate the sealing of points or lines 40 to the surface of the belt by minimizing the area of contact. Individual unit portions may be cut off as shown by the dotted lines 44—44 in Figure 5.

A further difference in the cleat shown in Figure 5 may be found in the use of the central reinforced rib 45. Again, this rib is made tapering from the main base portion so as to provide additional strength and resistance to shock. This type of cleat is somewhat less costly in manufacture and may be used in situations where the close and positive seal afforded by the cleat previously shown in Figures 1–4 may not be required.

Figures 8 and 9 illustrate a longitudinal cleat similar to that shown in Figures 1–4 but without the separable feature there depicted. A further significant difference lies in the planar construction of projections 22 and lips 33. Thus, longitudinal projections 22a and lips 33a project further from the base portion 46 than the corresponding lateral projections 22 and lips 33. This configuration has been found necessary due to the longer unsupported length of the longitudinal projections 22a and lips 33a. When the cleat is fastened to the belt, longitudinal lips 33a are compressed more than lateral lips 33. Then, as the belt is flexed over its supporting pulley or roller, it can be seen that the extremity of lips 33a must travel further to maintain the seal than any portion of lateral lip 33. Thus, a perfect seal is maintained between all of the sides of the cleat and the belt to which it is secured.

Figures 10 and 11 illustrate another embodiment of my improved cleat. Here the main base portion 25 is formed with a cylindrical concave portion 47 which extends the whole length of the cleat. The base 48 of the insert 21 is formed with the same radius of curvature as the concave portion 47. Plate 49 is also formed with the same curvature. This radius of curvature will be made generally somewhat less than that of the smallest pulley or roller to be used with a particular conveyor belt. This is so designed that, as shown in Figure 10, the belt 24 will be drawn up into the concave portion and plate 49 and the head of elevator bolt 23 will clear the surface of the pulley or roller.

It should be clear from the above description that I have provided a resilient cleat that can be easily installed in the field in accordance with the desires and designs of the user and, furthermore, possesses the unique ability of establishing an excellent seal with the surface of the belt to which it may be attached or secured.

It should also be understood that while I have shown three preferred forms of the cleat main body 20, I do not intend to be limited to those shapes. It is obvious that my invention is susceptible of some change and modification without departing from the spirit thereof.

Having thus described my invention, I claim:

1. In combination with a conveyor belt, a transversely disposed cleat of resilient material, one or more threaded inserts molded therein, one or more flat headed bolts threadedly engaging said inserts for removably securing said cleat to said belt and a belt engaging surface on said cleat formed with a plurality of equal concave portions whose edges are adapted to be placed under compression when said cleat is secured to said belt.

2. A cleat as claimed in claim 1 wherein said equal concave portions are in the form of truncated pyramids, each portion having four sealing edges adapted to be placed under compression when said cleat is secured to said belt thereby forming a sanitary seal between said cleat and said belt.

3. A cleat as claimed in claim 1 further characterized by having the leading and trailing edges of said cleat undercut whereby the area of contact defined by said sealing edges is less than the cross sectional area of the main body of said cleat.

References Cited in the file of this patent
UNITED STATES PATENTS

| | | |
|---|---|---|
| 415,434 | Baker | Nov. 19, 1889 |
| 417,065 | Miller | Dec. 10, 1889 |
| 991,739 | Morris | May 9, 1911 |
| 1,327,296 | Solem | Jan. 6, 1920 |
| 1,547,276 | Wentz | July 28, 1925 |
| 2,305,044 | Toews | Dec. 15, 1942 |